Feb. 22, 1949.   G. J. KOEHLER   2,462,646
FLUID VALVE
Filed June 30, 1944

Inventor
GUSTAVE J. KOEHLER
BY Richard Van Buren
HIS Attorney

Patented Feb. 22, 1949

2,462,646

UNITED STATES PATENT OFFICE 2,462,646

FLUID VALVE

Gustave J. Koehler, Los Angeles, Calif.

Application June 30, 1944, Serial No. 542,932

5 Claims. (Cl. 251—132)

This invention relates to fluid valves and is particularly directed to a small spring-closed valve having a conveniently located and easily operable manipulative member for opening and retaining the valve in open position.

One object of the present invention is the provision of a fluid valve having a self-closing valve member and conveniently located and easily operable means to move and retain the valve member in open position.

Another object is to provide a fluid valve having a spring-closed valve member with a conveniently located manually operable member for moving the valve member to open position and for retaining said member in open position.

A further object is to provide a fluid valve with a spring-closed valve member which is normally closed, and to further provide a conveniently located and easily operable manipulative element for moving the valve member to open position and for retaining said member in open position, said valve member arranged to automatically move to closed position upon release of the manipulative member.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Description

Figure 1:
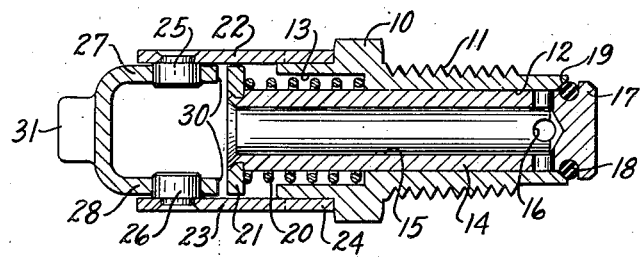
Fig. 1 is a longitudinal section view of the complete valve taken along line 1—1 (Fig. 3), showing the details of construction of said valve.

The present invention is directed to a small and efficient fluid valve for various uses—for example, such as in the fuel systems, lubricant circulating systems, and cooling systems of internal combustion engines, where it is necessary or desirable to drain off small quantities of fluid at frequent intervals in order to eliminate the accumulation of undesirable fluids and foreign substances. Obviously these are but a few of the representative uses of the valve of this invention, as there are many other ways in which such a valve may be used to advantage.

The valve of this invention is provided with a spring-closed valve member which is normally in closed position, and said valve is provided with a conveniently located manipulative cam element for moving said valve member to open position against the action of the spring and for retaining said member in open position as long as it is necessary or desirable.

The valve is so arranged that one manipulation of the cam element opens the valve wide and holds it in open position until said cam element is manipulated a second time to release the valve member to the action of its spring, which immediately moves said member to closed position and retains it thus.

Referring to the figures of the drawings, the fluid valve of this invention comprises a body portion 10 formed preferably of hexagonal stock to provide suitable wrench-engaging surfaces for turning pipe threads 11, formed on the inner end of said body portion, into any suitable threaded receptacle. The valve body 10 has a central bore 12 and a counterbore 13, said bore arranged to freely receive a cylindrical valve member 14 having a central bore 15 with the inner end closed, except for a plurality of small holes 16 diverging at right angles thereto. The inner end of the valve member 14 has a head 17 formed thereon with an adjacent annular groove arranged to receive a sealing seat ring 18 formed of any suitable material, such as synthetic rubber. The sealing ring or washer 18 is arranged to engage a conical valve seat 19 formed on the inner end of the valve body 10 adjacent the bore 12. The sealing ring 18 is normally maintained in yielding engagement with the conical valve seat 19 by a compressible spring 20 freely encircling the periphery of the valve member 14 at its outer end and confined in the counterbore 13 by a washer 21 secured on a tenon formed on the outer end of said valve member 14. The washer 21 may be secured on the tenon on the valve member 14 by ring-staking, riveting, or any other suitable method.

Figure 2:
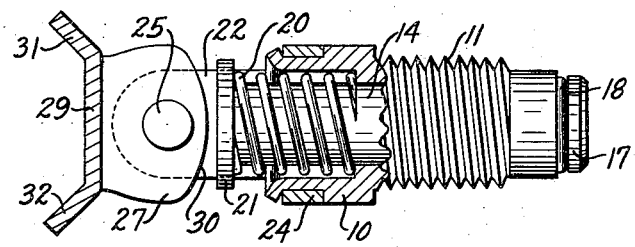
Fig. 2 is a right-angled projection of Fig. 1, partially sectioned along line 2—2 (Fig. 3) to better show the manipulative element for opening the valve.
Figure 3:
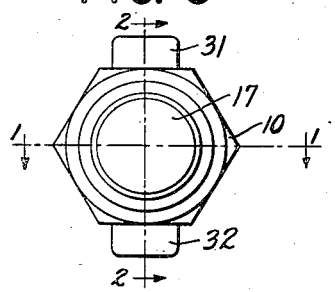
Fig. 3 is an end view of the complete valve.
Figure 4:
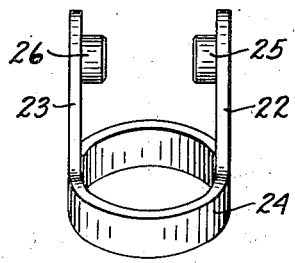
Fig. 4 is a perspective view showing in detail the bracket for supporting the operating element.

The washer 21 has diametrically opposed parallel flat surfaces which fit freely between similar uprights 22 and 23 of a bracket 24 having a ring-shaped portion fitting over a tenon formed on the outer end of the valve body 10 (Figs. 1 and 4), said bracket being secured in place on said tenon by ring-staking or any other suitable method, as shown in Fig. 2. The similar uprights 22 and 23 of the bracket 24 carry, respectively, studs 25 and 26, which freely engage holes in symmetrical bent-over projections 27 and 28 of a valve-opening element 29 to maintain camming surfaces 30, formed on the lower edges of said projections 27 and 28, in proper relationship with the top surface of the washer 21, with which said camming surfaces coact. The valve-opening element 29 is provided with symmetrical finger-pieces 31 and 32 for manipulating said element.

Use of the finger-pieces 31 or 32 to rock the valve-opening element 29 in either direction causes the symmetrical camming surfaces 30 formed on the projections 27 and 28, in cooperation with the top surface of the washer 21, to move the valve member 14 inwardly, against the action of the spring 20, to disengage the sealing ring 18 from the seat 19 and to simultaneously expose the diverging holes 16 to the fluid source, thus permitting the fluid to flow through said holes 16 and the bore 15 in said valve member. When the valve-opening element 29 approaches the extent of its rotative or opening movement in either direction, high portions or peaks of the camming surfaces 30 move into alinement with the horizontal center line of the pivot studs 25 and 26 and the bore 12 (Fig. 5) to secure said member 14 in open position, in which it will remain until the element 29 is manually rotated in the opposite direction to withdraw the peaks of the camming surfaces 30 from the top surface of the washer 21, whereupon the spring 20, in cooperation with the declining angle of said camming surfaces 30, assists the element 29 to normal position, as shown in Fig. 2, and at the same time moves the valve member 14 to closed position.

Figure 5:
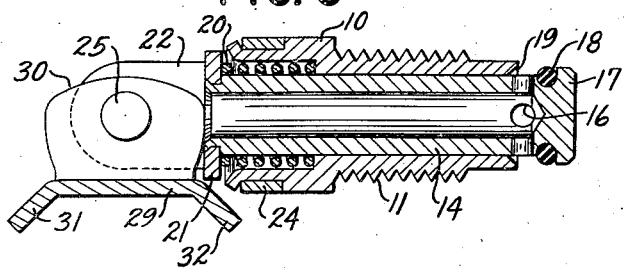
Fig. 5 is a longitudinal sectional view similar to Fig. 2, showing the valve in open position.

It will be noted, by observing Fig. 5, that, when the element 29 is in open position, it does not in any way interfere with the flow of fluid through the bore 15 in the valve member 14. Likewise it will be noted that the outer surface of the element 29 and the finger-pieces 31 and 32 protect the finger of the operator from the outgoing fluid while the valve is being opened.

It is to be understood that the camming surfaces 30 are so arranged in relation to the top surface of the washer 21 that, unless the element 29 is moved full distance in either direction to fully open the valve member 14, as shown in Fig. 5, the spring 20 will cause the top surface of the washer 21, in cooperation with the declining portions of said camming surfaces 30, to move said valve member 14 to closed position and simultaneously return the element 29 to normal or closed position. In other words, when the opening element 29 is moved full distance in either direction, the high portions or peaks of the camming surfaces 30 form locking angles between the top surface of the washer 21 and said element 29 to hold the valve member 14 in open position. The valve will remain open until the element 29 is again manipulated to move the high portion of the camming surfaces 30 thereof beyond the horizontal center line, whereupon the spring 20 causes the top surface of the washer 21, in cooperation with the declining portions of said camming surfaces 30, to return the element 29 to normal or closed position while moving the valve member 14 also to closed position.

It will be noted, by referring to Figs. 1 and 2, that, when the element 29 is in closed position, as shown here, clearance is provided between the camming surfaces 30 and the top surface of the washer 21 to provide ample room for the sealing ring 18 to properly engage the conical seat 19.

If desired, a friction washer may be inserted between the inside surface of one of the uprights 22 or 23 of the bracket 24, and the corresponding outer surface of the bent-over projection 27 or 28 of the element 29, to frictionally retain said element in closed position.

The device disclosed herein is ideally adapted for applications where it is desirable to employ a valve that is foolproof, in that it is either fully open or fully closed, one that will remain closed under all reasonable circumstances unless intentionally opened, one that will not easily jar open or open from excessive vibration, and one that may be opened or closed with minimum effort and maximum safety even when located in positions difficult of access.

While the form of mechanism herein shown and described is admirably adapted to fulfill the objects primarily stated, it is to be understood that it is not intended to confine the invention to the one form or embodiment disclosed herein, for it is susceptible of embodiment in various forms, all coming within the scope of the claims which follow.

What is claimed is:

1. In a fluid valve, the combination of a valve body having a bore therethrough; a conical seat formed about the bore; a valve member movably supported in the bore; a seat-engaging portion on the member; a spring arranged to urge the valve member to closed position to normally retain the seat-engaging portion in yielding engagement with the conical seat; a bracket connected to the valve body, said bracket having symmetrical uprights; alined trunnions supported by the uprights; a valve-operating element having symmetrical camming extensions formed thereon which cooperate with the valve member, said extensions having alined holes which freely engage the trunnions to pivotally mount said operating element between the uprights; and symmetrical finger pieces formed on the operating element for moving it in either of two directions to cause the camming extensions to move the valve member to open position to disengage the seat-engaging portion from the conical seat, said camming extensions constructed and arranged to be effective to retain the valve member in open position and said finger pieces constructed and arranged to be effective to limit the opening movement of the operating element.

2. In a fluid valve, the combination of a valve body having a bore therethrough; a conical seat formed about the bore; a valve member movably supported in the bore, said member having therein a fluid passage for draining fluid from a fluid source; an enlarged head on the valve member cooperating with the conical seat to seal the passage from the fluid source; a spring constructed and arranged to yieldingly retain the head in engagement with the conical seat; a bracket secured on the valve body; parallel uprights on the bracket which straddle the valve member and the outlet opening of the fluid passage therein, said uprights supporting alined trunnions; a valve member operating element, comprising a central portion having parallel extensions which fit between the uprights, said extensions having alined holes which freely engage the trunnions to pivotally mount the element between said uprights and over the fluid passage, said extensions having diverging camming surfaces which cooperate with the valve member; and similar finger pieces diverging from opposite sides of the central portion of the operating element for moving said element in either of two directions to cause the camming surfaces to move the valve member to open position to disengage the head from the seat and to simultaneously connect the passage to the fluid source, said central portion and said finger pieces constructed and arranged to function as a shield to protect the operator's hand from the outward flow of fluid through the passage.

3. In a fluid valve, the combination of a valve body having a central bore and a counter bore; a conical valve seat formed at one end of the bore; a valve member freely supported in the bore, said member having a fluid passage formed therein open at the outer end and closed at the inner end, said passage connectable by diverging holes near the closed end to a source of fluid to provide a passage therefor; an enlarged seat-engaging portion formed on the member adjacent the diverging holes; a washer secured near the outer end of the member adjacent the counter bore; a spring freely encircling the member and compressed between the bottom of the counter bore and the washer, to normally retain the seat-engaging portion in yielding contact with the conical seat, to seal the diverging holes from the fluid source; a bracket secured to the valve body; parallel uprights formed on the bracket; alined trunnions supported by the uprights; a valve-operating element having formed thereon parallel camming extensions which cooperate with the washer, said extensions having alined holes which freely engage the trunnions to pivotally mount said element between the uprights; and symmetrical finger pieces formed on the operating element for moving it in either of two directions to cause the camming extensions, in cooperation with the washer, to move the valve member to open position against the action of the spring, to disengage the seat-engaging portion from the conical seat and to expose the diverging holes to the fluid source, said camming extensions constructed and arranged to be effective to retain the valve member in open position until the operating element is restored in a reverse direction, said finger pieces also constructed and arranged to be effective to limit the opening movement of said element.

4. In a fluid valve, the combination of a valve body having a central bore and a counter bore; a conical valve seat formed at one end of the bore; a valve member freely supported in the bore, said member having a fluid passage formed therein open at the outer end and closed at the inner end, said passage connectable by diverging holes near the closed end to a source of fluid to provide a passage therefor; an enlarged seat-engaging portion formed on the member adjacent the diverging holes; a washer secured near the outer end of the member adjacent the counter bore; a spring freely encircling the member and compressed between the bottom of the counter bore and the washer, to normally retain the seat-engaging portion in yielding contact with the conical seat, to seal the diverging holes from the fluid source; a bracket secured to the valve body; parallel uprights formed on the bracket; alined trunnions supported by the uprights; a valve-operating element comprising a central portion with symmetrical camming extensions having diverging camming surfaces cooperating with the washer, said extensions having alined holes which freely engage the trunnions to pivotally mount the element between the uprights and over the fluid passage whereby the central portion of said element serves to divert the fluid stream to protect the operator's person therefrom; and symmetrical finger pieces diverging from the central portion of the element for moving it in either of two directions to cause the camming surfaces, in cooperation with the washer, to move the valve member to open positon against the action of the spring to expose the diverging holes to the fluid source, said camming surfaces constructed and arranged to be effective to hold the member in open position until the operating element is restored in a reverse direction, said finger pieces also constructed and arranged to be effective to limit the opening movement of said operating element.

5. In a fluid valve, the combination of a valve body having a bore therethrough; a conical seat formed in the body about the bore; a valve member movably supported in the bore; a seat-engaging portion on the member; a spring constructed and arranged to urge the member to closed position to retain the seat-engaging portion in yielding engagement with the conical seat; symmetrical uprights supported by the valve body; alined trunnions supported by the uprights; a valve-operating element having symmetrical camming extensions formed thereon, which cooperate with the valve member, said extensions having alined holes which freely engage the trunnions to pivotally mount said operating element between the uprights; and symmetrical finger pieces formed on the operating element for moving it in either of two directions to cause the camming extensions to move the valve member to open position to disengage the seat-engaging portion from the conical seat, said camming extensions constructed and arranged to be effective to retain the valve member in open position, and said finger pieces constructed and arranged to be effective to limit the opening movement of the operating element.

GUSTAVE J. KOEHLER.

REFERENCES CITED

The following references are of record in the file of this patent:

UNITED STATES PATENTS

| Number | Name | Date |
|---|---|---|
| 407,971 | Siersdorfer | July 30, 1889 |
| 1,369,877 | Beck | Mar. 1, 1921 |
| 1,655,241 | Rice | Jan. 3, 1928 |
| 1,665,934 | Schieber | Apr. 10, 1928 |
| 1,961,469 | West | June 5, 1934 |
| 2,009,845 | Farmer | July 30, 1935 |
| 2,077,460 | Coffelder | Apr. 20, 1937 |
| 2,095,696 | Hackel | Oct. 12, 1937 |

FOREIGN PATENTS

| Number | Country | Date |
|---|---|---|
| 540,843 | Great Britain | Oct. 31, 1941 |